(12) United States Patent
Mueller-Weinfurtner

(10) Patent No.: US 9,294,999 B2
(45) Date of Patent: Mar. 22, 2016

(54) TECHNIQUE FOR MAINTAINING A RADIO TIME BASE

(75) Inventor: Stefan Mueller-Weinfurtner, Nuremberg (DE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 27 days.

(21) Appl. No.: 14/130,763

(22) PCT Filed: Jul. 5, 2011

(86) PCT No.: PCT/EP2011/003333
§ 371 (c)(1),
(2), (4) Date: Jan. 3, 2014

(87) PCT Pub. No.: WO2013/004257
PCT Pub. Date: Jan. 10, 2013

(65) Prior Publication Data
US 2014/0140255 A1 May 22, 2014

(51) Int. Cl.
*H04W 52/02* (2009.01)
*G08C 17/00* (2006.01)

(52) U.S. Cl.
CPC ........ *H04W 52/0238* (2013.01); *H04W 52/029* (2013.01); *Y02B 60/50* (2013.01)

(58) Field of Classification Search
CPC . H04W 52/02; H04W 52/0216; H04W 84/12; H04W 52/0229; H04W 84/18
USPC .......................................................... 370/311
See application file for complete search history.

(56) References Cited

U.S. PATENT DOCUMENTS

| 5,150,361 | A  | * | 9/1992  | Wieczorek et al. ........... 370/311 |
| 6,453,181 | B1 |   | 9/2002  | Challa et al. |
| 2002/0127987 | A1 | * | 9/2002  | Kent .............................. 455/255 |
| 2006/0205382 | A1 | * | 9/2006  | Wang et al. ................ 455/343.1 |
| 2007/0105525 | A1 |   | 5/2007  | Wang et al. |
| 2007/0135081 | A1 |   | 6/2007  | Bultan et al. |
| 2009/0154385 | A1 | * | 6/2009  | Makhija et al. ............... 370/311 |
| 2009/0180414 | A1 | * | 7/2009  | Maeda et al. ................. 370/311 |
| 2010/0309834 | A1 | * | 12/2010 | Fischer et al. ................ 370/312 |
| 2010/0309848 | A1 | * | 12/2010 | Erceg et al. .................... 370/328 |
| 2011/0105097 | A1 | * | 5/2011  | Tadayon et al. .............. 455/418 |
| 2013/0286917 | A1 | * | 10/2013 | Jia et al. ........................ 370/311 |

OTHER PUBLICATIONS

Steven Kay, "A Fast and Accurate Single Frequency Estimator", IEEE Transactions on Acoustics, Speech, and Signal Processing, vol. 32, No. 12, Dec. 1989, pp. 1987-1990.
(Continued)

*Primary Examiner* — Omar Ghowrwal
*Assistant Examiner* — Sanjay K Dewan
(74) *Attorney, Agent, or Firm* — Rothwell, Figg, Ernst & Manbeck, P.C.

(57) ABSTRACT

A technique for maintaining a radio time base used to schedule communication in a radio network (100) is provided. A method implementation (300) of the technique comprises determining (310) a course of a frequency relation; switching off (330) a reference oscillator (210) during a period of reduced power (418; 420); predicting (320) the frequency relation; restoring (340) the radio time base in or after the period of reduced power; and communicating (350) in the radio network at a time determined by the restored radio time base. The frequency relation is a relation between the reference oscillator and a clock (214). The predicting is based on a result of the determination and the restoring is based on a result of the prediction. The frequency relation is predicted for a given time in or after the period of reduced power.

22 Claims, 5 Drawing Sheets

200

(56) References Cited

OTHER PUBLICATIONS

"3rd Generation Partnership Project; Technical Specification Group Radio Access Network; User Equipment (UE) procedures in idle mode and procedures for cell reselection in connected mode (Release 10)", 3GPP TS 25.304 V10.0.0 (Mar. 2011), 51 pages.

"3rd Generation Partnership Project; Technical Specification Group Radio Access Network; Physical channels and mapping of transport channels onto physical channels (FDD) (Release 10)", 3GPP TS 25.211 V10.0.0 (Sep. 2010), 58 pages.

* cited by examiner

TECHNIQUE FOR MAINTAINING A RADIO TIME BASE

CROSS REFERENCE TO RELATED APPLICATION(S)

This application is a 35 U.S.C. §371 National Phase Entry Application from PCT/EP2011/003333 filed Jul. 5, 2011, the disclosure of which is incorporated by reference.

TECHNICAL FIELD

The present disclosure generally relates to the technical field of timing or scheduling radio communication. In particular, the disclosure relates to a technique for providing a radio time base used to schedule communication in a radio network.

BACKGROUND

Energy efficiency is an increasingly important requirement for devices that communicate in a radio network, and in particular for battery-powered mobile communication devices. Mobile communication devices are also referred to as User Equipment (UE) in the context of a cellular telecommunication network according to Universal Mobile Telecommunications System (UMTS), Long Term Evolution (LTE) or LTE-Advanced (each of which standardized by the $3^{rd}$ Generating Partnership Project, or 3GPP). Regarding mobile communication devices, long stand-by times are a criterion of user satisfaction. From the perspective of stationary communication devices, network providers also have gained interest in energy efficient "green" base stations as usage and density of radio networks increase.

In order to achieve energy efficiency and long stand-by times, communication protocols have been developed that schedule idle periods, in which the communication device enters a period of reduced power (also referred to as power-save mode). As a mobile communication example, the mobile communication device and the base station negotiate phases, in which data transfer occurs. During other times, the UE turns its receiver and transmitter off and enters a period of reduced power. As another example of mobile communication, the UE in a disconnected state may enter a period of reduced power, which is periodically interrupted for receiving a paging channel indicating an incoming call or a Short Message Service (SMS). Also in a connected state having a transmission structure with time slots including headers that define an address of the transmission, the UE may limit its reception period to the headers in each of the time slots in order to decide whether or not the transmission is relevant. In addition, a base station comprising a pool of Digital Signal Processors (DSPs) may switch off some or all of the DSPs depending on a current workload.

US 2007/0135081 A1 discloses a mobile communication device that comprises an oscillator providing accuracy for synchronized communication parameters in an active mode and a Real Time Clock (RTC) used as a frequency standard during reduced power operation. While power consumption of the RTC is reduced compared to the oscillator, the precision of the RTC is low.

U.S. Pat. No. 6,453,181 B1 suggests using a dedicated sleep clock for a sleep period. The mobile communication device receives signals from a base station having high timing accuracy. In order to compensate for a drift of the sleep clock, an initial frequency of the sleep clock is determined following power-up of the mobile communication device. Furthermore, during a slotted mode of operation, a dynamic frequency error compensation factor is updated by determining an amount of timing slew between the mobile communication device and the base state.

In prior art devices, reasonable accuracy of the radio time base is thus achieved after returning from a power-save period by comparing an RTC with an oscillator signal or with a base station signal, each of which being time consuming to achieve sufficient accuracy and lasting up to one second. The most recent comparison is used to restore the radio time base. Such a conventional comparison thus takes a relatively long time (e.g., compared to the power-save period) or may prevent a further increase in accuracy that would take even longer. Furthermore, in order to account for, e.g., temperature variations, the comparison has to be updated, which still further increases time and power consumption, and may eventually lead to the need of keeping the oscillator permanently active.

If the accuracy was reduced, errors in the time base after the power-save period could lead to a loss of the paging signal as the correct time window for radio reception is missed. One might consider compensating for the reduced accuracy by waking-up the UE an additional time before the paging window. The additional time may correspond to an uncertainty in the time base or may allow for additional processing to achieve time synchronization based on the received radio signal. Such compensation, however, entails an increase in power consumption due to prolonged radio reception time.

SUMMARY

It is an object to provide a more efficient technique for maintaining a radio time base.

According to a first aspect, a method of maintaining a radio time base used to schedule communication in a radio network is provided. The method comprises determining a course of a frequency relation between a reference oscillator and a clock; switching off the reference oscillator during a period of reduced power; predicting, based on a result of the determination and for a given time in or after the period of reduced power, the frequency relation between the reference oscillator and the clock; restoring, based on a result of the prediction, the radio time base in or after the period of reduced power; and communicating in the radio network at a time determined by the restored radio time base.

The radio time base may be maintained over and/or beyond the period of reduced power. Determining the course of the frequency relation can encompass that the frequency relation may be determined as a function of discrete or continuous time. The prediction may not need to rely on a single determination or measurement of the frequency relation. The prediction may take into account a progressive change or systematic drift of the frequency relation, e.g., due to the clock.

The clock may trigger at least one of a start time of the period of reduced power, the switching off, the restoring, and an end time of the period of reduced power. The determination may be directly followed by the period of reduced power. The prediction may relate to the same physical quantity as the determination at a later given time. The predicting may be performed during the period of reduced power. Alternatively, the prediction may be completed prior to the period of reduced power. The radio time base prior to the period of reduced power and/or the determined course may be stored in a non-volatile memory for the prediction. Alternatively or in addition, the prediction may be stored in a non-volatile memory for the restoring. The communication time determined by the restored radio time base may indicate a time frame on a paging channel of the communication. The communication may comprise at least one of signal reception at a device performing the method and signal transmission from the device. The communication may be limited to reception or downlink communication. In addition, the communication may be limited to paging reception. There may be no uplink transmission in the course of at least one of the maintaining of the radio time base and the communication.

The course of the frequency relation may be represented by a sequence of the frequency relation for a plurality of points in time prior to the period of reduced power. The last of the plurality of points in time of the sequence may be directly before the period of reduced power. The determined sequence may be stored in a non-volatile memory for the prediction.

The reference oscillator may provide a reference frequency. The clock may provide a clock frequency. The frequency relation may be a frequency ratio between the reference frequency and the clock frequency, or any numerical representation thereof. The frequency ratio may be on the order of, or above, 500 or 1000. The frequency ratio may be at least one of estimated, numerically represented, and processed as a multiple or fraction of the frequency ratio. The numerical representation may include the storing in the memory. The processing may include any one of the processing steps mentioned herein. The reference oscillator and the clock may be collocated.

Determining the course of the frequency ratio may include estimating the frequency ratio for each of the plurality of points in time of the sequence. The estimation of the frequency ratio may account for frequency multiplications. The estimation of the frequency ratio may also be referred to as calibration. The frequency ratio may be estimated by means of at least one of a maximum likelihood estimator and a least square estimator. The frequency ratio may be estimated by means of linear regression.

The estimation of the frequency ratio may include sampling a clock signal provided by the clock. The samples (e.g., denoted by "$C_i$") may be numbered (e.g., by "i"). As an example, the samples may be numbered consecutively (e.g., as " . . . , $C_{123}$, $C_{124}$, $C_{125}$, . . . , $C_{287}$, $C_{288}$, $C_{289}$, . . . , $C_{447}$, $C_{448}$, $C_{449}$, . . . "). A subset (e.g., " . . . , $C_{124}$, $C_{288}$, $C_{447}$, . . . ") of the samples may be associated with a tic of the clock or an edge of the clock signal. The estimation of the frequency ratio may be based on the numbers (e.g., " . . . , 124, 288, 447, . . . ") of those samples associated with the tic of the clock or the edge of the clock signal. The estimation of the frequency ratio may be based on differences of those sample numbers (e.g., " . . . , 288-124, 447-288, . . . ", i.e., " . . . , 164, 159, . . . "). All of the differences may be reduced by a predefined offset (e.g., by "150" so that " . . . , 164-150, 159-150, . . . " results in " . . . , 14, 9, . . . "). The predefined offset may be equal for at least two or all estimations. The offset may be a typical value, a mean value, or a minimum value of the differences. The reduction by the offset may improve at least one of numerical representation or numerical computation. Using the minimum value may allow basing the computation entirely on unsigned numbers.

The clock signal may be sampled over a sampling time interval referred to as a calibration interval. The calibration interval may encompass the corresponding one of the plurality of points in time of the sequence. The "corresponding one" for a given calibration interval may be the point in time of the sequence, for which the frequency ratio is, or is to be, estimated based on samples taken in the given calibration interval. The corresponding point in time of the sequence may be a beginning of the calibration interval or may be centred in the calibration interval.

The calibration interval may be shorter than a (minimum or average) temporal separation between (subsequent ones of) the points in time of the sequence. The temporal separation between the points in time of the sequence may be multiple times longer than the calibration interval. The temporal separation between the points in time of the sequence may be 2 to 5 times longer (e.g., 3 times longer) than the calibration interval. The clock signal may be sampled for a predetermined number of cycles of the clock. As an example, the predetermined number may be a power of two, e.g., $2^S$ for S=1, 2, 3, 4, 5, . . . , 8, 9, 10, 11, 12, . . . , 16.

A sampling frequency of the sampling may be derived from the reference oscillator. The sampling frequency may be an integer multiple of the reference frequency. Alternatively or in addition, the sampling frequency may be derived by means of a first Phase-Locked Loop (first PLL). The first PLL may be connected with the reference oscillator. The sampling frequency may be 2 to 12 times greater (e.g., 8, 9 or 10 times greater or more than 12 times greater) than the reference frequency.

The method may further comprise postponing the period of reduced power for further determination, if the course of the frequency relation determined so far is insufficient or fulfils an insufficiency criterion. The criterion may be that the course of the frequency relation is shorter than a minimum length. Alternatively or in addition, the criterion may be that a number of the plurality of points in time of the sequence falls below a predetermined minimum number. Alternatively or in addition, the criterion may be that a maximum temporal separation between subsequent ones of the plurality of points in time of the sequence exceeds a predefined maximum separation. Alternatively or in addition, the criterion may be that a temporal separation between a beginning of the determined course and the start time of the period of reduced power exceeds a maximum length. The predefined minimum number may be 3, 4, 5, or 10. The predefined maximum separation may be 2 to 10 times of the calibration interval (e.g., 3 or 4 times of the calibration interval). The sequence may thus be seamlessly extended or continued until the minimum number of points in time of the sequence is reached. The determination, or the further determination, may end directly before the period of reduced power.

The frequency relation may be predicted by determining a function out a predefined set of functions. The frequency relation may be predicted by estimating the function given the course of the frequency relation or the sequence. The frequency relation may be predicted by means of a maximum likelihood estimator or a least square estimator. The frequency relation may be predicted by fitting the function to the course of the frequency relation or the sequence. A parameter (e.g., one or more values) of the set of functions may be determined or estimated. The set of functions may be a linear function space, exemplarily polynomials of a predefined degree. The frequency relation may be predicted by means of extrapolation of the course of the frequency relation or the sequence. The parameter (e.g., one or more coefficients) may be determined by projecting the course of the frequency relation or the sequence to the linear function space. The frequency relation may be predicted by means of linear, quadratic or cubic regression of the sequence. The quadratic regression may also be referred to as second-order regression.

The plurality of points in time of the sequence may be equidistant in time. Alternatively or in addition, the sequence may further comprise a time stamp for each of the plurality of points in time. The prediction may involve a numerical computation of one or more sums of absolute values of the time stamps of the sequence. The prediction may be independent of signs of the time stamps of the sequence.

The radio time base may be derived from the reference oscillator prior to and/or after the period of reduced power. The radio time base may thus be derived from the reference oscillator in normal power operation, i.e., outside the period of reduced power. The radio time base may be derived by means of a second Phase-Locked Loop, or second PLL. The second PLL may be connected with the reference oscillator. The second PLL may update the radio time base. At least one of the second PLL and a radio interface of the communication device may be further switched off during the period of reduced power. At least one of the reference oscillator, the second PLL, and the radio interface may be switched on in or prior to the step of restoring. The reference oscillator may be driven and/or synchronized by a radio signal or system clock while the radio interface is enabled. The system clock may be modulated on, or encoded in, the radio signal of the radio network. Alternatively, the reference oscillator may run freely.

Predicting the frequency relation for the given time may include a prediction for at least one of the period of reduced power, a point in time within the period of reduced power, and a point in time after the period of reduced power. Alternatively or in addition, the predicting and/or the restoring may further include computing, based on the prediction, the radio time base for the end time of the period of reduced power or a time after the period of reduced power.

The current radio time base may be represented by a counter. The counter may be trigged by the second PLL. The counter may be stopped (e.g., halted or "frozen") at the start time of the period of reduced power and/or continued (e.g., resumed) at the end time of the period of reduced power.

Restoring the radio time base may include incrementing the counter based on a duration of the period of reduced power and the frequency relation predicted for the point in time within or after the period of reduced power. The duration of the period of reduced power may be an integer number of cycles of the clock. The correctness of the prediction may be based on a mean value theorem for integration. Alternatively or in addition, restoring the radio time base may include incrementing the counter based on the frequency relation predicted for the period of reduced power. The restoring may be based on a sum or an integral of the frequency relation predicted for the period of reduced power.

The techniques presented herein may be realised in the form of software, in the form of hardware, or using a combined software/hardware approach. As regards a software aspect, a computer program product comprising program code portions for performing the steps presented herein, when the computer program product is run on one or more computing devices, may be provided. The computer program product may be stored on a computer-readable recording medium. The medium may comprise a memory chip, an optical medium, a hard disk, and so on. Moreover, the computer program product may be provided for download onto such a recording medium.

According to a further aspect, a device for maintaining a radio time base used to schedule communication in a radio network is provided. The device comprises a determination unit adapted to determine a course of a frequency relation between a reference oscillator and a clock; a scheduler adapted to switch off the reference oscillator during a period of reduced power; a prediction unit adapted to predict, based on a result of the determination and for a given time in or after the period of reduced power, the frequency relation between the reference oscillator and the clock; a restoration unit adapted to restore, based on a result of the prediction, the radio time base in or after the period of reduced power; and a communication unit adapted communicate in the radio network at a time determined by the restored radio time base.

The device may function as, or be part of, a mobile or stationary device. The device may further include any feature and may be adapted to perform one or more of above steps mentioned in the context of the method aspect, and vice versa.

BRIEF DESCRIPTION OF THE DRAWINGS

Further aspects and advantages of the technique presented herein will become apparent from the following description of preferred embodiments and the drawings, wherein.

DETAILED DESCRIPTION

In the following description of preferred embodiments, for purposes of explanation and not limitation, specific details are set forth, such as particular signal processing components and sequences of steps, in order to provide a thorough understanding of the present disclosure. It will be apparent to one skilled in the art that the techniques described herein may be practiced in other embodiments that depart from these specific details. For example, while the following embodiments will primarily be described in context with a mobile communication device, the present disclosure can also be implemented in a stationary terminal or a base station. Furthermore, while some embodiments relate to an exemplary LTE implementation, it will be readily apparent that the techniques described herein may also be implemented in any other mobile or stationary communication network, including an UMTS network or an LTE-Advanced network.

Moreover, those skilled in the art will appreciate that the services, functions and steps explained herein below may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described in context with methods and devices, the technique presented herein may also be embodied in a computer program product as well as in a system comprising a computer processor and a memory coupled to the processor, wherein the memory is encoded with one or more programs that may perform the services, functions and steps disclosed herein.

In the following embodiments, a technique for maintaining a radio time base will exemplarily be described for the case of a time base used to schedule communication on a paging channel of a radio network. Protocols, timings and transmission structures for paging channels are defined in standard document 3GPP TS 25.211 V10.0.0 (particularly in Sects. 4.1.2.3 and 5.3.3.10) and, in the context of discontinuous reception (DRX), in standard document 3GPP TS 25.304 V10.0.0 (particularly in Sect. 8.3), each of which is and/or will be published by 3GPP. The invention is not necessarily limited to a communication device or a wired/wireless network. The technique also applies to maintaining timing information with granularity on the order of an inverse reference frequency (e.g., on the order of 10 ns) and accuracy requirements on the order of 10 times the inverse reference frequency (e.g., on the order of 100 ns) based on a clock, such as a Real Time Clock, with a clock period on the order of 300, 500 or 1000 times the inverse reference frequency. By example, the inverse frequency is on the order of 30000 ns, i.e. 30 microseconds.

Figure 1:
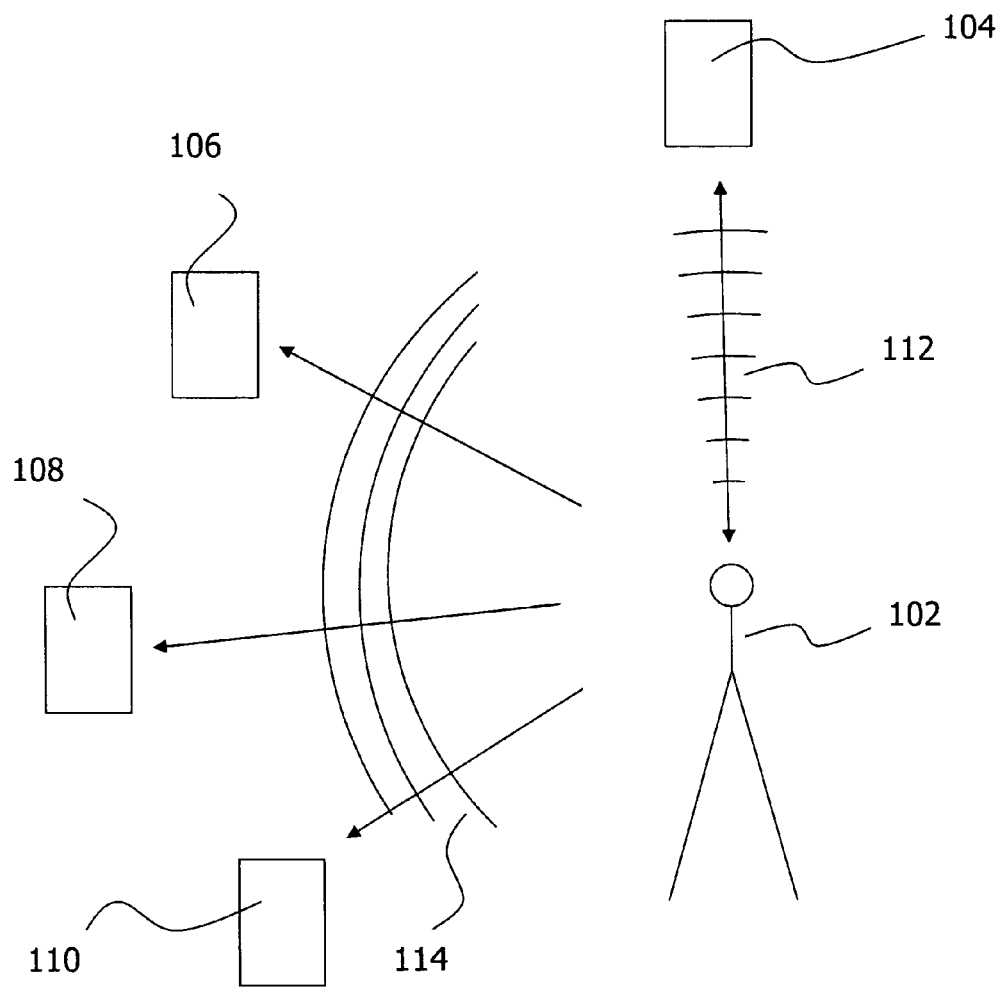
FIG. 1 schematically illustrates at least a portion of a radio network.

FIG. 1 schematically illustrates a cell out of a plurality of cells of a radio network 100. The radio network 100 comprises a base station 102, which range of communication covers the cell. The base station 102 is an example of a stationary communication device in the radio network 100. The radio network 100 further comprises a plurality of mobile communication devices 104, 106, 108 and 110.

In the instance schematically illustrated in FIG. 1, the mobile communication device 104 is in a connected state with the base station 102 as part of a Radio Access Network (RAN) of the radio network 100. The connected state between the base station 102 and the mobile terminal 104 includes an essentially continuous communication 112 of simultaneous reception and transmission. The mobile communication devices 106-110 are in a disconnected state. A period of reduced power is periodically entered by each of the mobile communication devices 106-110. The communication devices enter the period of reduced power essentially synchronously. The periodicity is in the range of 0.5 to 2.5 seconds. The mobile communication devices 106-110 return essentially synchronously to an active state, which moment is schematically illustrated in FIG. 1. The active state is significantly shorter than the periodicity, typically shorter by a factor 10 or more. In the active state, the mobile communication devices 106-110 are adapted to receive a paging indicator signal 114 on a paging indicator channel. A similar situation arises, when one of the mobile communication devices 106-110 is connected to the base station 102 according to a discontinuous reception (DRX) protocol.

For successful reception of a paging message, each of the mobile communication devices 106-110 maintains its own local radio time base, which triggers the activation of a receiver and further processing stages downstream the receiver for signal analysis. Using the radio time base, each of the mobile communication devices 106-110 derives a first time frame and receives the paging indicator signal 114. The paging indicator signal 114 is broadcasted to all mobile communication devices 104-110 in the same cell during the first time frame. In case the system information comprises a paging indicator, the mobile communication device 106, 108 or 110 derives a second time frame using the radio time base and the paging indicator. The mobile communication device 106, 108 or 110 then receives a second radio signal comprising the paging message in the second time frame on a second common channel. In case the radio network 100 is configured according to UMTS, the paging indicator in the Paging Indicator Channel (PICH) frame indicates the Secondary Common Control Physical Channel (S-CCPCH) frame that carries the paging information. If the paging indicator in the PICH frame is set, the paging message is transmitted on the Paging Channel (PCH) in the S-CCPCH frame starting at a predefined offset after the transmitted PICH frame. In the case of UMTS, the offset equals 7680 chips. A constant chipping rate is 3840000 chips per second.

It is thus important to provide an accurate radio time base in the active state or even shortly before returning from the period of reduced power to the active state.

Figure 2:
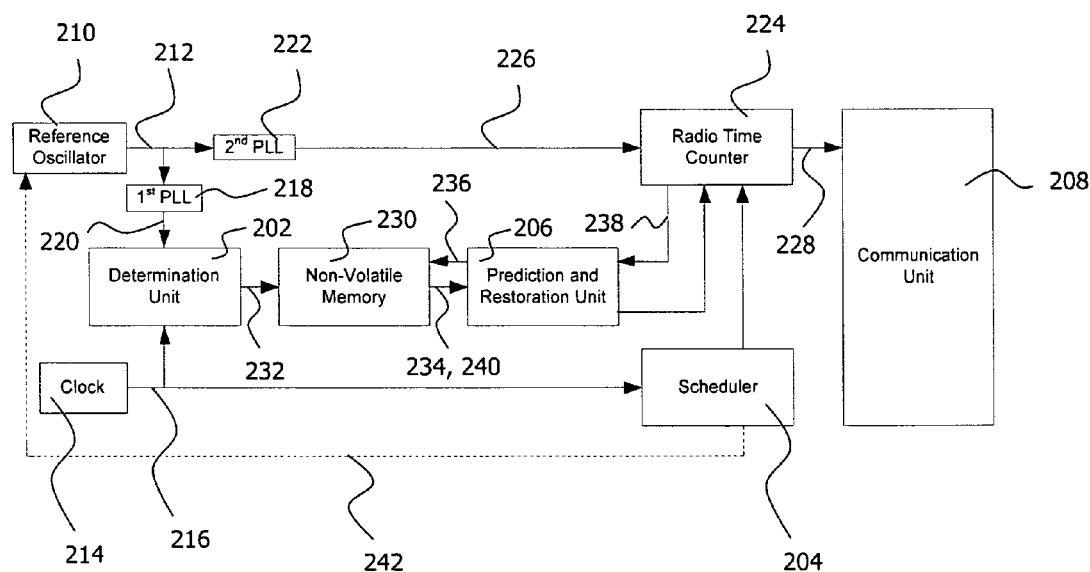
FIG. 2 schematically illustrates at least a portion of a communication device including an embodiment of a device for maintaining a radio time base used to schedule communication in the radio network of FIG. 1.

FIG. 2 schematically illustrates an embodiment of a device 200 for maintaining a radio time base in one of the mobile communication devices 104-110 or the base station 102 as a stationary communication device. The device 200 comprises a determination unit 202, a scheduler 204, a prediction and restoration unit 206, and a communication unit 208.

The device 200 further comprises a reference oscillator 210 adapted to provide a reference frequency signal 212 and a real time clock 214 adapted to provide a clock signal 216. The real time clock 214 is always enabled, i.e., continuously provides the clock signal 216. Generally speaking, the reference oscillator 210 generates the reference frequency signal 212 only in the active state of the device 200.

The reference oscillator 210 may be synchronized with the base station 102. In the latter case, the reference oscillator 210 is a Voltage-Controlled Oscillator (VCO) controlled in a closed-loop. Alternatively, the reference oscillator 210 may run freely in one of the mobile communication devices 104-110, which performs digital corrections in its data path as well as for maintaining the time base.

The real time clock 214 has a significantly lower power consumption as compared to the reference oscillator 210. The reference frequency signal 212 is highly accurate and significantly more stable as compared to the clock signal 216. As compared to the clock, the reference frequency has a higher frequency, less jitter, and less phase noise. The clock signal 216 is a rectangular signal. The nominal clock frequency of the real time clock 214 is $f_{rtc}$=32768 Hz. The highly accurate reference frequency of the reference oscillator 210 is $f_{ref}$=26 MHz.

As shown in FIG. 2, the device 200 comprises a first phase-locked loop 218 (first PLL 218). The reference frequency signal 212 of the reference oscillator 210 is input to the first PLL 218. The first PLL 218 generates a sampling signal 220 locked in phase to the highly accurate reference frequency signal 212. The sampling signal 220 is thus derived from the reference oscillator 210 via frequency multiplication. In the embodiment of the device 200 illustrated in FIG. 2, a first multiplication factor of the first PLL 218 equals M=8, such that a nominal value of the also highly accurate sampling frequency is $f_{smp}$=208 MHz. The sampling signal 220 is provided to the determination unit 202.

The device 200 further comprises a second phase-locked loop 222 (second PLL 222) and a radio time counter 224. The reference frequency signal 212 of the reference oscillator 210 is input to the second PLL 222. The second PLL 222 is adapted to generate a trigger signal 226 locked in phase with the highly accurate reference frequency signal 212. The trigger signal 226 is thus derived from the reference frequency signal 212 of the reference oscillator 210 via frequency multiplication by a second frequency multiplication factor Q in the second PLL 222. The radio time counter 224 represents the radio time base. More specifically, a radio time base signal 228 provided by the radio time counter 224 represents the current radio time base. The radio time counter 224 is updated in response to a zero-crossing of the trigger signal 226. The zero-crossing can be either raising or falling. The radio time counter 224, and as a result the radio time base signalled to the communication unit 208, are incremented at the rate of the trigger signal 226 in the active state.

Still in the active state of the receiving portion 200, and in preparation for a later period of reduced power, the clock signal 216 of the real time clock 214 and the also highly accurate sampling signal 220 derived from the reference oscillator 210 are input to the determination unit 202. The determination unit 202 is adapted to determine a course, i.e., a time-dependence, of a frequency relation between the reference frequency of the reference oscillator 210 and the clock frequency of the real time clock 214. As explained in more detail below, the fast sampling signal 220 is used to sample the slow clock signal 216 of the real time clock 214. Denoting the first multiplication factor of the first PLL 218 by M, a frequency ratio $$r = f_{ref}/f_{rtc} = f_{smp}/(f_{rtc} \cdot M) \quad \text{(Eq. 1)}$$

represents the frequency relation. The frequency ratio serves as a calibration value for the clock 214, since there is essentially no relevant drift in the reference frequency $f_{ref}$ due to the reference oscillator 210 and no uncertainty in the first multiplication factor M due to the first PLL 218. A nominal value of the frequency ratio for the embodiment of the device 200 shown in FIG. 2 is 793.457. A change in the frequency ratio r represents an inaccuracy, in particular a drift, of the real time clock 214.

The device 200 further comprises a non-volatile memory 230 accessible by the determination unit 202 and the prediction and restoration unit 206. The determination unit 202 stores the determined course 232 of the frequency ratio r in the non-volatile memory 230.

Optionally, the scheduler 204 is adapted to disable the reference oscillator 210 the first PLL 218 and the second PLL 222 upon entrance into the period of reduced power. The disabling of the reference oscillator 210 is illustrated by a dotted arrow 242. The real time clock 214 is the only time emitter available in the device 200 during the period of reduced power. The clock signal 216 provided by the real time clock 214 is further input to the scheduler 204. The scheduler 204 is further adapted to enable, after a predetermined number P of cycles of the clock signal 216, the reference oscillator 210, the first PLL 218 and the second PLL 222 as is described below.

The prediction and restoration unit 206 reads the stored course 234 of the frequency ratio from the non-volatile memory 230. The prediction and restoration unit 206 is further adapted to predict for a given time in the period of reduced power a frequency ratio denoted by r. The predicted frequency ratio r is one value $a_0$ predicted for a point in time centred in the period of reduced power in a first embodiment of the device 200. In an advanced second embodiment of the device 200, the predicted frequency ratio r(t) is a function of time t. The time variable t covers the period of reduced power. In other words, the period of reduced power is a domain of the function r(t).

As a result of the prediction, the prediction and restoration unit 206 is adapted to compute an initial value 236 for the radio time counter 224 based on the predicted frequency ratio and a last radio time counter value 238. The last radio time counter value 238 is retrieved from the radio time counter 224 at a start time of the period of reduced power. The start time is denoted by $t_S$. In the first embodiment of the device 200, the initial value 236 for the radio time counter 224 is computed according to $$\text{last radio time counter value} + P \cdot Q \cdot a_0. \quad \text{(Eq. 2)}$$

The predicted frequency ratio, $a_0$, is thus used as a scaling factor to predict a number of hypothetical cycles of the reference oscillator 210 in the period of reduced power. In the second embodiment of the device 200, the initial value 236 for the radio time counter 224 is computed according to $$\text{last radio time counter value} + Q \cdot \int_{t_S}^{t_E} r(t) dt. \quad \text{(Eq. 3)}$$

The initial value 236 is thus predicted based on a time integral of the frequency ratio predicted as a function of time, t, for the period of reduced power with start time $t_S$ and end time $t_E$. The time t is measured in units of cycles of the clock 214. In a preferred implementation, the time integral is approximated by a sum over points in time in the period of reduced power.

In the case of the free-running reference oscillator 210, a system correction factor, $\lambda_u$, is estimated, stored, and updated. The system correction factor, $\lambda_u$, represents a deviation between the system clock provided by the base station 102 and the reference oscillator 210. The factor Q in above Eq. 2 and Eq. 3 is replaced by $Q^*\lambda_u$ for the free-running reference oscillator 210. Alternatively, the definition of the frequency ratio according to Eq. 1 includes the system correction factor $\lambda_u(t)$ for the time t of the estimation. The Eq. 2 and the Eq. 3 for the prediction are unchanged. The first approach is referred to as a pre-compensation and the latter approach is referred to as a post-compensation of the deviation of the free-running reference oscillator 210.

The initial value 236 for the radio time counter 224 is stored in the non-volatile memory 230. The prediction and restoration unit 206 is adapted to restore the radio time counter 224 at the end time, $t_E$, of the period of reduced power by reading the stored initial value 240 from the non-volatile memory 230 and writing the stored initial value 240 into the radio time counter 224. The communication unit 208 is adapted to communicate in the radio network 100 at a time determined using the restored radio time base value 228.

Figure 3A:
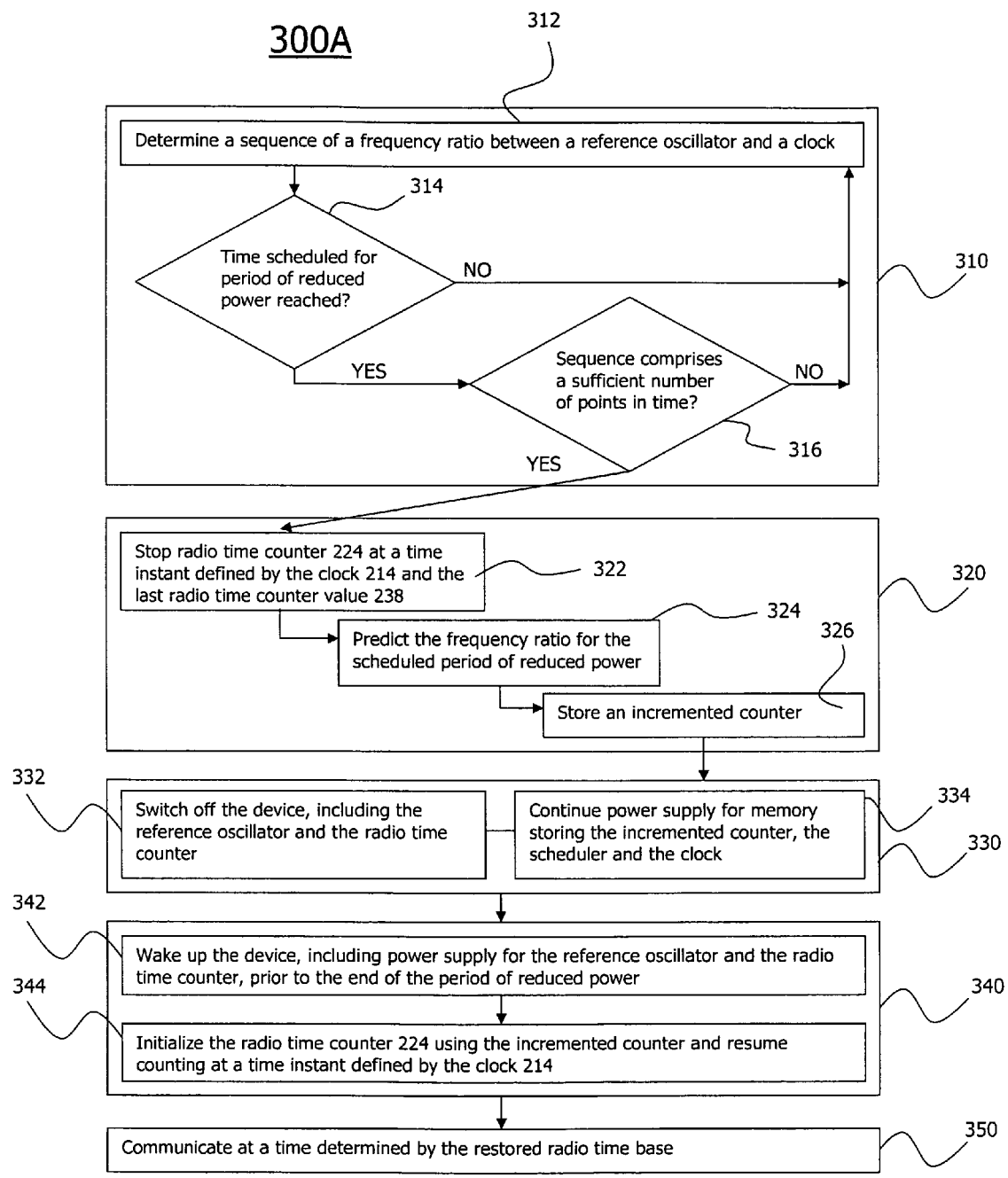
FIGS. 3A and 3B, each shows a flow diagram including an embodiment of a method of maintaining a radio time base used to schedule communication in the radio network of FIG. 1.

FIG. 3A schematically illustrates an embodiment of a method 300A of maintaining a radio time base used to schedule communication in the radio network 100. The method 300A can be performed by the device 200. The radio time base can be represented by the radio time counter 224 and/or the radio time base value 228. The communication can be a reception, transmission, or duplex communication performed by the communication unit 208.

The method 300A comprises a step 310 of determining a course of a frequency relation between a power-consuming highly accurate reference oscillator and a clock. The reference oscillator can be the reference oscillator 210 and the clock can be the real time clock 214 of the device 200. The method 300A further comprises a step 320 of predicting, based on a result of the determination 310 and for a given time in or after a period of reduced power, the future frequency relation between the reference oscillator 210 and the clock 214. The reference oscillator 210 is switched off in a step 330 during the period of reduced power, which step can be performed by the scheduler 204 of the device 200. The method 300A comprises a step 340 of restoring, based on a result of the prediction 320, the radio time base in the period of reduced power. The prediction 320 and the restoration 340 can be performed by the prediction and restoration unit 206 of the device 200. At a time determined by the restored radio time base, the device 200 communicates in the radio network 100 according to a step 350 of the method 300A.

In the embodiment of the method 300A illustrated in FIG. 3A, the step 320 of predicting is performed prior to the step 330 of switching off. This temporal order may have the advantage of higher power reduction in the period of reduced power, including switching off the prediction and restoration unit 206. In an alternative embodiment, the step 320 of predicting is at least partially performed during the period of reduced power, which may have the advantage of using the relatively long period of reduced power for computations related to the prediction. Thus, computational performance requirements may be reduced.

In more detail, the step 310 of determining the course of the frequency relation comprises a sub-step 312 of determining a sequence of a frequency ratio between the reference oscillator 210 and the clock 214 for a plurality of points in time. At each of the points in time of the sequence, the frequency ratio is estimated as detailed below. The sequence includes a frequency ratio estimation and a time stamp for each point in time. In a sub-step 314, the scheduler 204 checks, if the start time scheduled for the period of reduced power is reached. The frequency ratio is thus periodically estimated until the start time of the period of reduced power is reached. In addition, in sub-step 316, the scheduler 204 or the prediction and restoration unit 206 checks, if the sequence representing the course of the frequency ratio already comprises a sufficient number of points in time. It is thus ensured that the sufficient number of frequency ratio estimations with time stamps appropriately separated in time is available in the non-volatile memory 230 before continuing with the prediction 320. If there are too few points in time available, additional estimations of the frequency ratio are performed. I.e., the sub-step 312 of determining the sequence is continued and the start time is postponed.

In a sub-step 322 of the step 320, the scheduler 204 stops the radio time counter 224 for the next P cycles of the clock 214. In addition, the prediction and restoration unit 206 retrieves the last radio time counter value 238 prior to switching off the radio time counter 224.

In a further sub-step 324, the prediction and restoration unit 206 computes the prediction for the frequency ratio for the upcoming period of reduced power as detailed below. In order to correct for stopping the radio time counter 224 for P cycles of the clock 214, the prediction and restoration unit 206 computes a correction or an increment according to the respective second term in above Eq. 2 or Eq. 3. The computed correction is added to the last radio time counter value 238 and the resulting initial value for the radio time counter 224 is stored in the non-volatile memory 230 according to a sub-step 326.

A software component of the communication device 104-110 prepares the entire communication device 104-110 for power-down according to a sub-step 332 of the step 330. The software component or the scheduler 204 disables the reference oscillator and most of the components of the communication device 104-110. Power is supplied only to the clock 214 and the scheduler 204 according to a sub-step 334. As the non-volatile memory 230 keeps its content also in the absence of power supply, the computed initial value for the radio time counter 224 is conserved.

The scheduler 204 enables power of the communication device 104-110, such that the reference oscillator 210 again provides the reference frequency signal 212 with high accuracy sufficiently before the number P of cycles of the clock 214, which indicates the end time of the period of reduced power, have passed according to a sub-step 342 of the step 340. The end time is denoted by $t_E$. The prediction and restoration unit 206 retrieves the stored initial value for the radio time counter 224 from the non-volatile memory 230 and uses it to initialize the powered but still inactive radio time counter 224 according to a sub-step 344. Here, "still inactive" means that the radio time counter 224 is not yet triggered. The period of reduced power ends when the scheduler 204 activates the radio time counter 224 exactly when the number P of cycles of the clock 214 have passed since the radio time counter 224 has been stopped in the sub-step 322. Complementary, "activated" means that the triggering starts.

In an extended embodiment of the method 300A, the communication unit 208 performs additional radio reception, based on which the prediction and restoration unit 206 corrects for minor timing errors in the radio time counter 204 before a radio signal of interest is received or transmitted in the step 350.

Figure 3B:
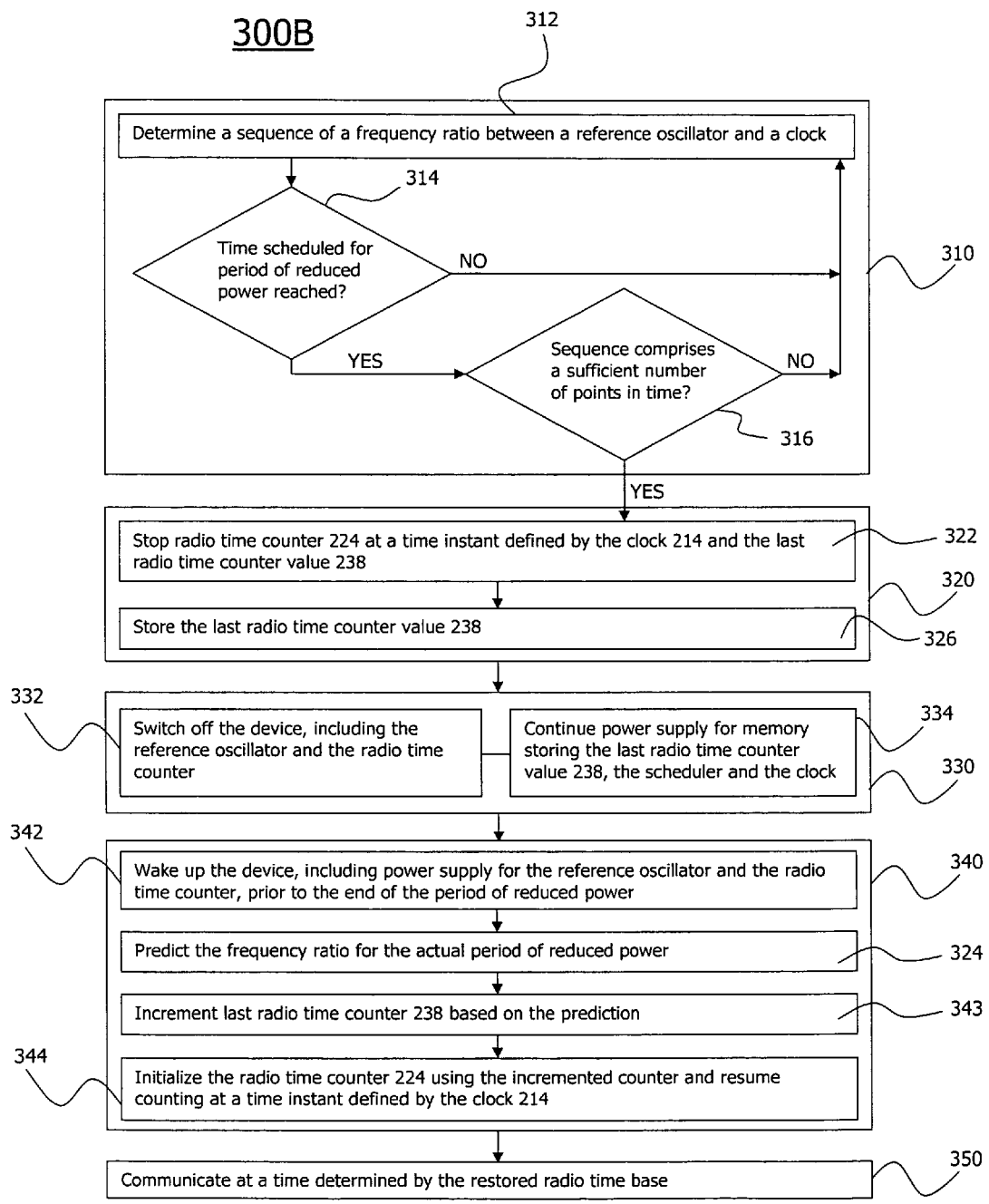

FIG. 3B shows a further flow diagram of a method 300B of maintaining a radio time base. The method 300B is a variant of the method 300A. Like reference signs are used to denote corresponding method steps or sub-steps, which respective description in the context of the method 300A also applies to the method 300B.

Generally speaking, the method 300B differs from the method 300A in that the sub-step of predicting 324 is shifted to the end of the period of reduced power 418. More specifically, a temporal order of the sub-step of predicting 324 is interchanged with the sub-steps of switching-off 332 and waking-up 342 the device 200. In an additional sub-step 343, the stored radio time counter value 238 is retrieved and incremented according to Eq. 2 or Eq. 3.

Figure 4:
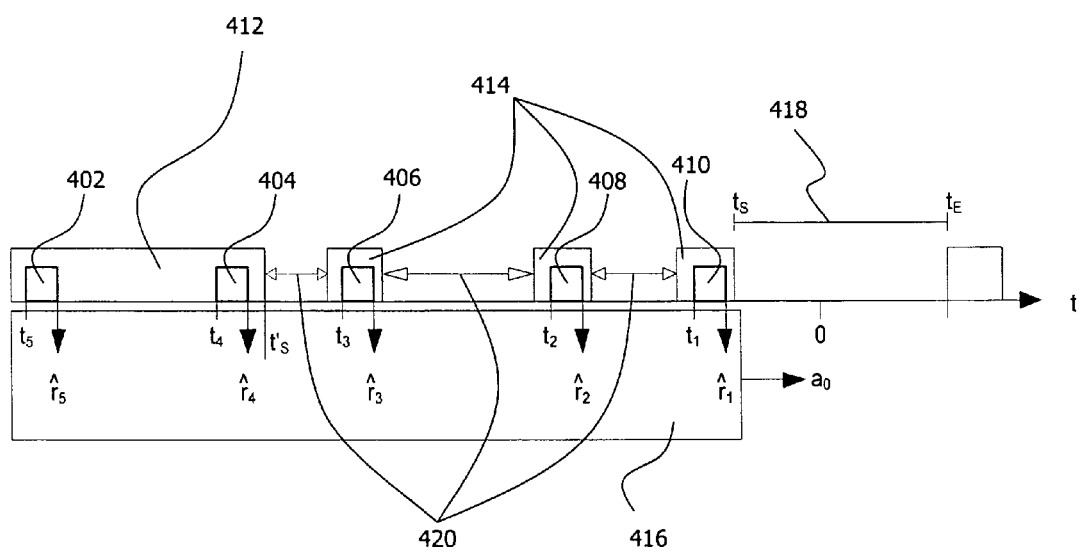
FIG. 4 schematically illustrates a time line as a result of the method of FIG. 3A or 3B performed by the device of FIG. 2.

In what follows, further details on the sub-step 312 of determining the sequence of the frequency ratio are provided with reference to FIG. 4, which schematically illustrates a timeline 400 including a plurality of calibration intervals 402-410. The calibration intervals 402 and 404 are scheduled for times $t_5$ and $t_4$ during a continuous active state 412 of the corresponding one of the communication devices 104-110. The start time of the period of reduced power, as originally scheduled by the scheduler 204, is denoted by $t'_S$. Since the number of 2 calibration intervals 402 and 404 available at the time $t'_S$ is considered insufficient for the prediction 320, the further calibration intervals 406-410 are scheduled for times $t_3$, $t_2$, and $t_1$ in dedicated active states 414. The resulting sequence thus includes, for each point in time $t_5$ to $t_1$, an estimation denoted by $\hat{r}_5$ to $\hat{r}_1$, respectively, prior to entering the period of reduced power 418 at the start time $t_S$.

It is to be noted that a sequence 416 comprising the plurality of points in time ($t_5, \ldots, t_1$) for determining the frequency relation may comprise further periods of reduced power 420 between the dedicated active states 414. The period of reduced power 418 is the most recent period of reduced power among a plurality of periods 418, 420 of reduced power. As to the prediction 320 for the given time (i.e., a point in time $t=0$, or a period $t_S$ to $t_E$) in or after the period of reduced power 418, the period of reduced power 418 is chosen out of the plurality of periods 418, 420 of reduced power as the first period of reduced power at which a sufficient number of calibration intervals 406-410 has been reached.

In each calibration interval, one current estimation of the frequency ratio between the reference oscillator 210 and the clock 214 is generated. Each of the generated estimations thus is a "snap-shot". More specifically, an estimation counter is started at a first edge in the clock signal 216 and incremented in response to each subsequent edge in the sampling signal 220 by the determination unit 202. The estimation counter thus is a counter for the sampling signal 220. The determination unit 202 captures out of the consecutive values $C_i$ of the estimation counter one estimation counter value at the occurrence of the first and each of the following edges in the clock signal 216 of the clock 214. The first and the following edges in the clock signal 216 are denoted by $C_{smp}(1)$ and $C_{smp}(2)$, respectively. In other words, the determination unit 202 determines the temporal position vector $C_{smp}$ of the tics of the clock 214 represented by the edges in the clock signal 216 in units of the faster and more accurate sampling signal 220. Since the sampling signal 220 has a frequency scaled by a first multiplication factor M in the first PLL 218 as compared to the reference frequency of the reference oscillator 212, a result of the estimation is divided by the first multiplication factor M, according to Eq. 1, to obtain the estimated frequency ratio. The estimation frequency is denoted by r̂ (or "r_hat" in below source code fragments) between the reference oscillator 210 and the clock 214.

A duration of each of the calibration intervals 402-410 is determined by the clock 214. In general, the duration of the calibration intervals 402-410 is an integer number of the cycles of the clock 214. With advantage for an implementation that assigns to each tic or edge of the clock signal 216 provided by the clock 214 an estimation or measurement value of the frequency ratio in the sequence using indices running from −K1 to +K1 and including the index 0, the duration of each of the calibration intervals 402-410 is an even number of cycles of the clock 214. In a preferred implementation, which is detailed by below two embodiments, the duration of each of the calibration intervals 402-410 is a power of two, $2^S$, of cycles of the clock 214. A typical range for S is 6, 7, . . . , 15, which corresponds to a calibration interval duration in the range of 1.95 ms to 1 s. In an alternative implementation, an odd number of clock cycles is used.

In a first embodiment of each of the method 300A or 300B, determining the sequence according to the sub-step 312 includes computing for each point in time of the sequence the slope of a regression line, which approximates the samples out of the estimation counter values and collected in the vector $C_{smp}$ (denoted by "C_smp" in below source code fragments). The regression line minimizes a mean-squared error. The frequency ratio estimated by the slope of the regression line achieves maximum-likelihood performance and attains the Cramér-Rau bound. A portion of an implementation of the first embodiment in terms of a programming language similar to MATLAB reads as follows:

```
% Perform estimation by actual determination
% of optimum slope of regression line for counter values
function r_hat = EstimatorRegression( C_smp, calib_smp_exp )
% K1 = K−1
K1 = 2^calib_smp_exp;
% Integer weights for regression (vector)
c = −K1/2 : K1/2;
% closed expression for
% sum( c.^2 ) = 2 * sum_{0}^{K1/2} k^2
sum_c_sq = (K1/2)*(K1/2+1)*(K1+1)/3;
% Compute the optimum slope of regression line
% by weighting the counter samples
r_hat = sum( c.* C_smp ) / sum_c_sq.
```

In a second embodiment of each of the method 300A or 300B, the same result for the estimation of the frequency ratio is obtained with an improved hardware implementation of the sub-step 312. Generally speaking, the second embodiment implements the regression by a weighted counter-difference estimation algorithm. The algorithm comprises three operations that are subsequently performed. The first operation is preferably implemented in hardware and is performed once at the beginning of the estimation. The second operation is also preferably implemented in hardware and performs a computation after each cycle of the clock 214 during the calibration interval (cf. the "for"-loop body recited below). The third operation is one final estimation. I.e., the third operation is performed once for each calibration interval, which is preferably implemented in software.

A portion of the implementation of the second embodiment reads as follows:

```
% Algorithm specification for estimation
% with parabolic weighting of the differences of counter values
function r_hat = EstimatorDiffWeight( C_smp, calib_smp_exp, r_off )
%%%%%% HW operation
% initialization to be done before or at first RTC signal edge
w_int = 2^(calib_smp_exp−1);     % value of weight
                                  % function at k = 0
dw = 2^(calib_smp_exp−1) − 1;    % first derivative of
                                  % weight function at k = 0
C_smp_prev = C_smp(1);
sum_w_int = 0;
%%%%%% Periodic HW operation
for k = 1 : 2^calib_smp_exp
    % per each of the following RTC signal edges
    delta = C_smp(1+k) − C_smp_prev − r_off;
    C_smp_prev = C_smp(1+k);
    sum_w_int = sum_w_int + w_int * delta;
    % update weight with first derivative and
    % subtract 1 from first derivative
    w_int = w_int + dw;
    dw = dw − 1;
end
% After calibration functionality in HW:
% SW reads 'sum_w_int' from registers
%%%%%% SW operation
% Total number of calibration counter
% value samples during calibration interval
K = 1 + 2^calib_smp_exp;
% Fractional weight factor
w_frac = 12 / (K^2−1) / K;
% Compute the estimated frequency ratio
r_hat = r_off + w_frac * sum_w_int.
```

The first operation is marked in the above-cited implementation by the comment "HW operation", the second operation is marked by the comment "Periodic HW operation", and the third operation is marked by the comment "SW operation".

The second embodiment is numerically attractive, since required word lengths for multiplications and accumulation (i.e., summation inside a "for"-loop) are significantly reduced. There is also a reduction compared to the first embodiment. Furthermore, the second operation and the third operation comprise a corresponding parameter "r_off", which is a numerical offset. The numerical offset allows largely reducing numerical values representing the difference of subsequent samples, which are computed as the value of "delta". The precision of the numerical representation is thus significantly increased. The numerical offset is chosen so as to keep the numerical range of "delta" and the resulting sum denoted by "sum_w_int" in a specific limit, since the frequency ratio has a certain range. The certain range is defined by the nominal frequencies of the reference oscillator 210 and the clock 214, a maximum component deviation, and a temperature range. The maximum component deviation includes a usually negligible deviation of the reference oscillator 210 and a more significant deviation of the clock 214. The temperature range is specified for the operation of the communication device 104-110. In addition, a fixed-point or floating-point representation for the numerical computation represents the value by more than 32 bits in "critical" computations, such that a precision of the estimation is not limited by the numerical computation.

As a further advantage, complexity of the implementation is reduced in the second embodiment due to a recursive computation that obtains the parabolic weights "w_int" at the end of the "for"-loop body in the second operation.

As discussed above, each calibration interval generates one estimation P for the frequency ratio r. The sequence determined according to the sub-step 312 comprises the estimations only, in case the estimations are based on calibration intervals 402-410 at equidistant temporal separation. The sequence does not require to further specify explicitly the points in time ($t_5, \ldots, t_1$) of the calibration intervals 402-410. In general, particularly for non-equidistant calibration intervals 402-410, a time position of each calibration interval is kept (i.e., stored) in the sequence together with the respective estimation. The time position is referred to as a time stamp of the estimation. Preferably, the time stamp represents a beginning of the corresponding calibration interval with a resolution of the cycles of the clock 214. In an alternative implementation, the time stamp indicates an ending of the calibration interval, or any other suitable time within the calibration interval. Furthermore, the resolution maybe improved using the reference oscillator 210 providing a higher temporal granularity as compared to the clock 214.

In what follows, further details on the sub-step 324 of predicting the frequency ratio based on the sequence of the frequency ratio determined in step 310 are provided in consistency with each of the aforementioned embodiments. The frequency ratio $\hat{r}$ estimated for each of the calibration intervals 402-410 may suffer from random noise and a systematic drift. The random noise can be eliminated basing the prediction on the entire sequence of the frequency ratio. The systematic drift of the frequency ratio $r(t)$ over time from calibration interval to calibration interval can be due to temperature changes. Since the systematic drift $r(t)$ is a slow process observable in the random noise, the sub-step 324 takes the systematic drift into account and thus compensates the drift in the clock 214. The sub-step 324 of predicting the frequency ratio predicts the frequency ratio for the period of reduced power by taking not only the most recent but several previous estimation results $\hat{r}$ in the sequence into account.

In one variation of each of the method 300A or 300B, the sub-step 324 predicts the frequency ratio $r$ by means of an extrapolation based on the second-order regression polynomial computed from a number of previous estimation results $\hat{r}$ of the sequence. The sequence is thus sufficient for the prediction, if the number of points in time of the sequence is at least three. In a reduced embodiment of each of the method 300A or 300B, the sub-step 324 uses an extrapolation based on linear regression and thus requires a number of two or more points in time of the sequence.

The second-order regression polynomial is represented by three coefficients denoted by $a_0$, $a_1$, and $a_2$, such that at least the past course of the frequency ratio is approximated by $$r(t) = a_0 + a_1 t + a_2 t^2 \text{ for } t \leq 0.$$

The second-order regression polynomial is usually an approximation good enough to base the prediction 324 on estimations of the calibration intervals 402-410 within the sequence 416 covering the previous 20 seconds before the start time $t_S$). The description is analogous for the reduced embodiment except for the coefficient $a_2=0$.

The origin of the time axis is chosen such that a given time, for which the frequency is to be predicted, is represented by $t=0$. Consequently, the coefficient $a_0 = r(0)$ is readily the predicted frequency ratio. The coefficient $\alpha_0$ is computed from the sequence of frequency ratios, which is collectively denoted by a column vector $\hat{r}$, obtained for the estimation points in time $t_1, t_2, t_3$, each of which is negative due to the chosen origin of the time axis. The time stamps in the sequence are collectively denoted by a corresponding column vector $\underline{t}$.

The coefficients, which are also collectively denoted by a column vector $\underline{a} = [a_0 \ a_1 \ a_2]^T$, are defined according to the maximum-likelihood regression by the minimum of a mean squared deviation:

$$a = \underset{\tilde{a}}{\operatorname{argmin}} \|\hat{r} - \underline{T}\tilde{a}\|^2 = \underset{\tilde{a}}{\operatorname{argmin}} (\hat{r}^T \hat{r} - 2\tilde{a}^T \underline{T}^T \hat{r} + \tilde{a}^T \underline{T}^T \underline{T}\tilde{a}),$$

with a polynomial time basis matrix $$\underline{T} = [\underline{t}^0 \underline{t}^1 \underline{t}^2],$$

wherein the respective exponents (0, 1, 2) indicate exponents that are to be individually performed for each element in the corresponding column vector $\underline{t}$.

The minimum, which corresponds to the maximum-likelihood regression, is found by setting the derivative of the mean squared deviation with respect to $\tilde{a}^T$ equal to zero, i.e. $-2\underline{T}^T\hat{r} + 2\underline{T}^T\underline{T}\tilde{a} = 0$:

$$\underline{T}^T \underline{T} a = \underline{T}^T \hat{r} \Leftrightarrow \begin{bmatrix} c_0 & -c_1 & c_2 \\ -c_1 & c_2 & -c_3 \\ c_2 & -c_3 & c_4 \end{bmatrix} \begin{bmatrix} a_0 \\ a_1 \\ a_2 \end{bmatrix} = \begin{bmatrix} y_0 \\ -y_1 \\ y_2 \end{bmatrix}.$$

In the above matrix equation defining the coefficients $\underline{a}$ of the polynomial prediction, the individual elements of the Hankel-type matrix $\underline{T}^T\underline{T}$ are given by $$c_v = (-1)^v (\underline{t}^x)^T \underline{t}^{v-x} = \sum_k |t_k|^v \geq 0,$$

wherein the integer value of x (which corresponds to different matrix elements of equal values above and below the diagonal of the Hankel-type matrix) drops out in the result for matrix elements denoted by the same index v in $c_v$. The elements of the vector $\underline{T}^T \hat{r}$ on the right-hand side of the matrix equation can be written as $$y_v = (-1)^v (\underline{t}^v)^T \hat{r} = \sum_k r_k |t_k|^v \geq 0.$$

While the time stamps denoted by $t_k$ have a negative sign, the variables $c_v$ and $y_v$ are defined including a sign reversal in the case of an odd index v to allow for numerical implementation using exclusively unsigned numbers.

As a result of the chosen origin of the time axis, which coincides with the given time for which the frequency ratio is to be predicted, only the coefficient $a_0$ (i.e., the first entry of the column vector $\underline{a}$ in the matrix equation) is to be computed. Given the comparatively low size of the matrix equation, Cramer's rule is advantageously applied to obtain the frequency ratio predicted for the given time:

$$a_0 = \det\left( \begin{bmatrix} y_0 & -c_1 & c_2 \\ -y_1 & c_2 & -c_3 \\ y_2 & -c_3 & c_4 \end{bmatrix} \right) \Big/ \det\left( \begin{bmatrix} c_0 & -c_1 & c_2 \\ -c_1 & c_2 & -c_3 \\ c_2 & -c_3 & c_4 \end{bmatrix} \right).$$

By evaluation of both determinants in the numerator and denominator, the frequency ratio predicted for the given time is explicitly:

$$a_0 = \frac{(c_2c_4 - c_3^2)y_0 - (c_1c_4 - c_2c_3)y_1 + (c_1c_3 - c_2^2)y_2}{(c_2c_4 - c_3^2)c_0 - (c_1c_4 - c_2c_3)c_1 + (c_1c_3 - c_2^2)c_2} = \frac{f_0 y_0 - f_1 y_1 + f_2 y_2}{f_0 c_0 - f_1 c_1 + f_2 c_2},$$

wherein the multiplicative factors $f_0$, $f_1$, and $f_2$ are defined by the respective expressions in round brackets.

As has become apparent from the above description of individual embodiments, some or all embodiments solve problems related to errors in maintaining or restoring a radio time base, which is important, for example, in order not to miss a paging reception of a communication determined by the restored radio time base. In prior art techniques providing a radio time base, errors may be caused by a temperature drift in a real time clock frequency or system clock frequency during the relatively long period of reduced power. This problem may at least partially be solved by above-described prediction based on a previously determined sequence of a frequency ratio. The determination may detect the drift and may accurately predict the future frequency ratio for a given time in or after the period of reduced power accordingly.

Furthermore, prior art techniques providing a radio time base may suffer from calibration errors, which may even be multiplied by the relatively long period of reduced power, due to jitter for detecting edges in a clock signal of a real time clock due to analogue circuit noise; due to frequency variation of the real time clock caused by temperature drift during a relatively short calibration interval; due to random phase shifts between the independently oscillating clock signal of the real time clock and a sampling signal thus causing synchronization errors; and due to rounding errors or truncation errors in a fixed-point implementation of an estimation of a frequency ratio (i.e., an implementation that counts a number of complete cycles of reference oscillator and clock, respectively). Such calibration errors may be reduced or almost eliminated as a result of an estimation based on linear or higher order regression. "Numerical noise" may be reduced by subtracting an offset. The estimation may reach or exceed a precision of 0.01 ppm (i.e., $10^{-8}$).

At least some embodiments of the technique for maintaining a radio time base as disclosed herein enable power savings. Most components of the device for maintaining a radio time base, or even of the communication device including a receiver and a reference oscillator, can be powered down during a period of reduced power. Since an accuracy achieved by the estimation may be very high, even if using relatively short calibration intervals, the prediction based on the estimation may achieve high accuracy. As a further result of the accuracy, less processing for correcting the restored time base is needed before the desired radio signal is receivable in the communication at a time determined by the restored radio time base. The technique disclosed may further allow for power savings at extreme temperatures or temperature variations, at which a slope of frequency change for crystals as a function of temperature is relatively large.

It is believed that many advantages of the invention will be fully understood from the foregoing description, and it will be apparent that various changes may be made in the form, construction and arrangement of the exemplary aspects thereof without departing from the scope of the invention or without scarifying all of its advantages. Because the invention can be varied in many ways, it will be recognized that the invention should be limited only by the scope of the following claims.

The invention claimed is:

1. A method of maintaining a radio time base used to schedule communication in a radio network, the method comprising:
   determining a course of a frequency relation between a reference oscillator and a clock, wherein the course of the frequency relation is represented by a sequence of the frequency relation for a plurality of points in time prior to a period of reduced power, and wherein determining the course of the frequency relation includes estimating the frequency relation for each of the plurality of points in time of the sequence;
   determining whether the course of the frequency relation determined so far is insufficient;
   switching off the reference oscillator during the period of reduced power, wherein the period of reduced power is postponed for further determination as a result of a determination that the course of the frequency relation determined so far is insufficient;
   predicting, based on a result of the first determination and for a given time in or after the period of reduced power, the frequency relation between the reference oscillator and the clock;
   restoring, based on a result of the prediction, the radio time base in or after the period of reduced power; and
   communicating in the radio network at a time determined by the restored radio time base.

2. The method of claim 1, wherein the reference oscillator provides a reference frequency and the clock provides a clock frequency, and the frequency relation is a frequency ratio between the reference frequency and the clock frequency.

3. The method of claim 2, wherein the frequency ratio is estimated by means of at least one of a maximum likelihood estimator and a least square estimator.

4. The method of claim 2, wherein the estimation of the frequency ratio includes sampling a signal provided by the clock.

5. The method of claim 4, wherein the samples are numbered and the estimation of the frequency ratio is based on those sample numbers associated with an edge of the clock signal.

6. The method of claim 5, wherein the estimation is based on differences of those sample numbers and each of the differences is reduced by an offset common to all of the differences.

7. The method of claim 4, wherein the clock signal is sampled over a sampling time interval encompassing the corresponding one of the plurality of points in time of the sequence.

8. The method of claim 4, wherein the clock signal is sampled for a predetermined power of two of cycles of the clock.

9. The method of claim 4, wherein a frequency of the sampling is derived from the reference oscillator by means of a first Phase-Locked Loop, or first PLL, connected with the reference oscillator.

10. The method of claim 2, wherein the frequency ratio is on the order of or above 1000.

11. The method of claim 1, wherein the period of reduced power is postponed for further determination, if at least one of a number of the plurality of points in time of the sequence falls below a predetermined minimum number and a temporal separation between the plurality of points in time of the sequence exceeds a predefined maximum separation.

12. The method of claim 1, wherein predicting the frequency relation includes extrapolating the sequence.

13. The method of claim 12, wherein the plurality of points in time of the sequence is equidistant in time or the sequence further comprises a time stamp for each of the plurality of points in time.

14. The method of claim 13, wherein the prediction involves a numerical computation of one or two sums of absolute values of the time stamps of the sequence.

15. The method of claim 1, wherein the frequency relation is predicted for at least one of the period of reduced power, a point in time within the period of reduced power, and a point in time after the period of reduced power.

16. The method of claim 1, wherein the radio time base is represented by a counter.

17. The method of claim 15, wherein restoring the radio time base includes incrementing the counter based on a duration of the period of reduced power and the frequency relation predicted for the time within or after the period of reduced power.

18. The method of claim 15, wherein restoring the radio time base includes incrementing the counter based on a sum or integral of the frequency relation predicted for the period of reduced power.

19. A computer program product comprising a non-transitory computer readable medium storing program code portions for performing the steps of claim 1 when the computer program product is executed by a computing device.

20. A device for maintaining a radio time base used to schedule communication in a radio network, the device comprising:

a computer processor; and a memory coupled to the computer processor, wherein the memory stores one or more programs configured to cause the computer processor to:

determine a course of a frequency relation between a reference oscillator and a clock, wherein the course of the frequency relation is represented by a sequence of the frequency relation for a plurality of points in time prior to a period of reduced power, and wherein determining the course of the frequency relation includes estimating the frequency relation for each of the plurality of points in time of the sequence;

switch off the reference oscillator during a period of reduced power and postpone the period of reduced power for further determination when the course of the frequency relation determined so far is insufficient;

predict, based on a result of the determination and for a given time in or after the period of reduced power, the frequency relation between the reference oscillator and the clock;

restore, based on a result of the prediction, the radio time base in or after the period of reduced power; and communicate in the radio network a time determined by the restored radio time base.

21. The device of claim 20, wherein the frequency relation is represented by a frequency ratio.

22. The device of claim 21, wherein the one or more programs are further configured to cause the computer processor to extrapolate the sequence to or beyond the period of reduced power.

* * * * *